March 12, 1940. N. C. PRICE 2,193,141
HEATING SYSTEM FOR SUPERCHARGED CABINS
Filed Aug. 23, 1937 4 Sheets-Sheet 3
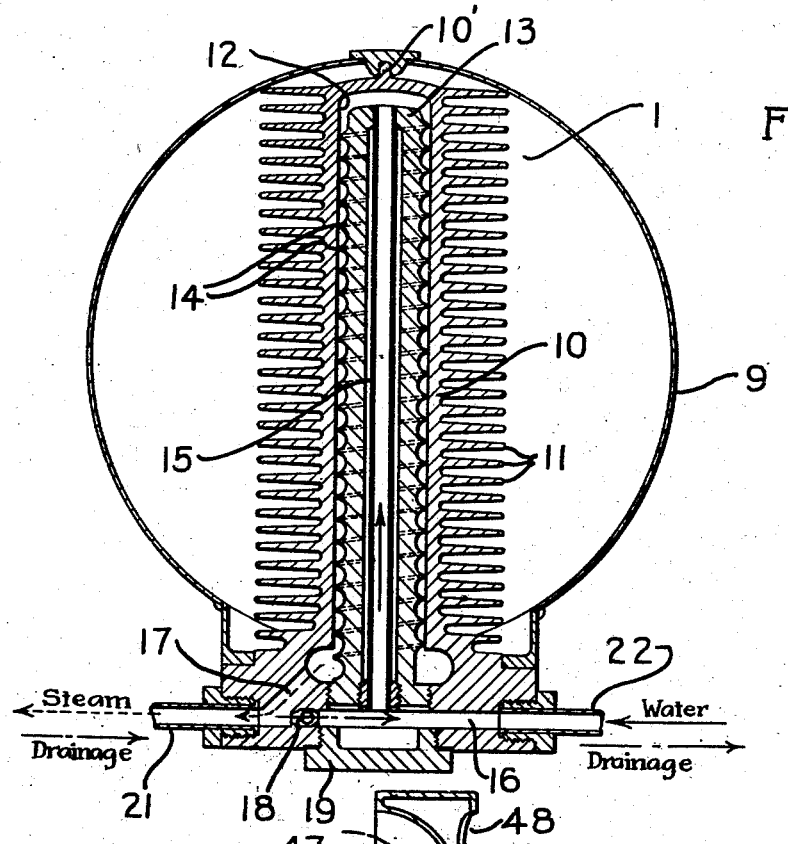
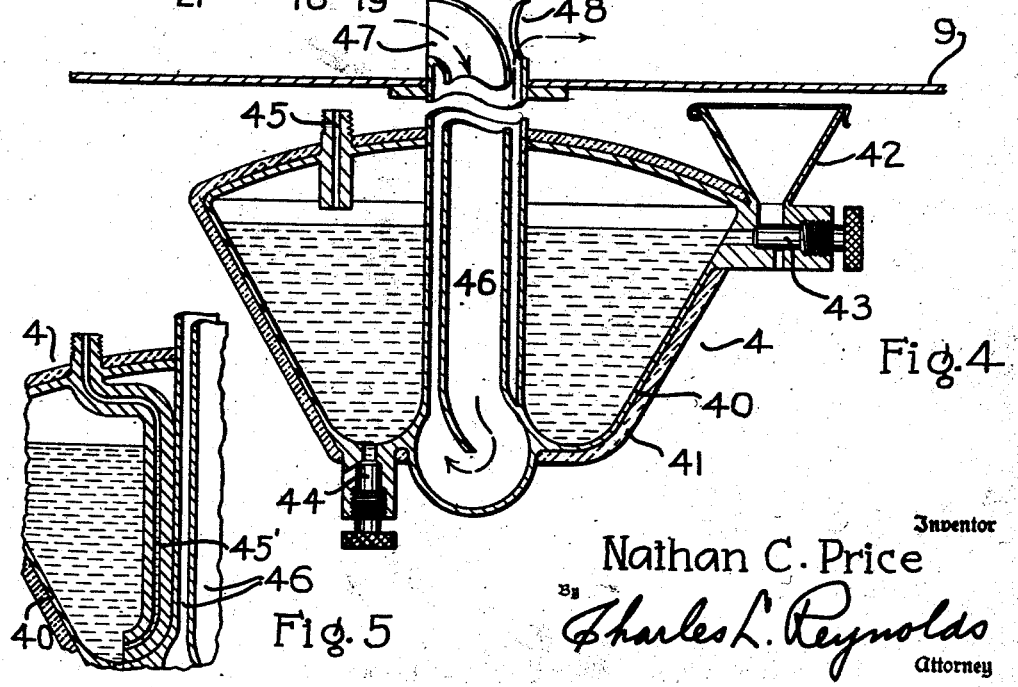
Inventor
Nathan C. Price
By Charles L. Reynolds
Attorney March 12, 1940. N. C. PRICE 2,193,141
HEATING SYSTEM FOR SUPERCHARGED CABINS
Filed Aug. 23, 1937 4 Sheets-Sheet 4
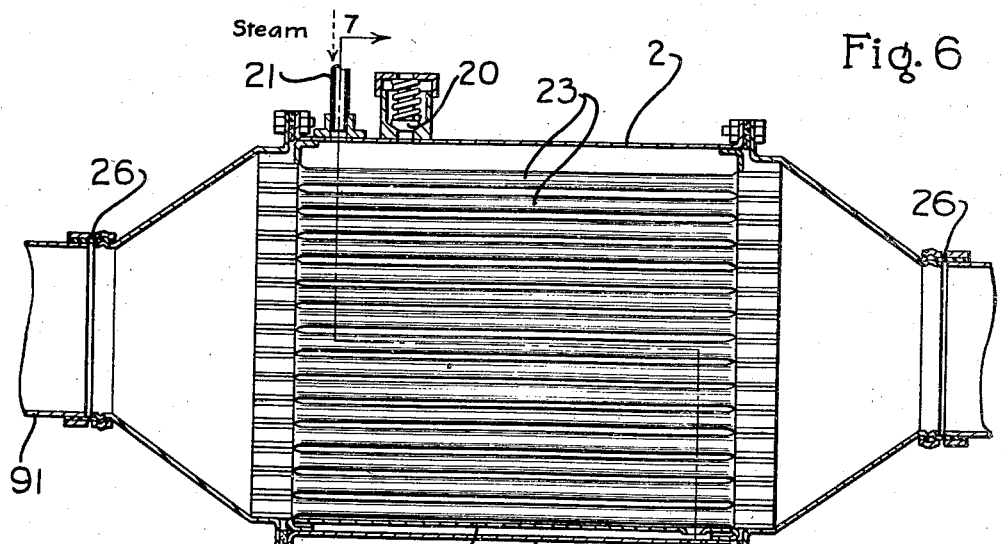
Fig. 6
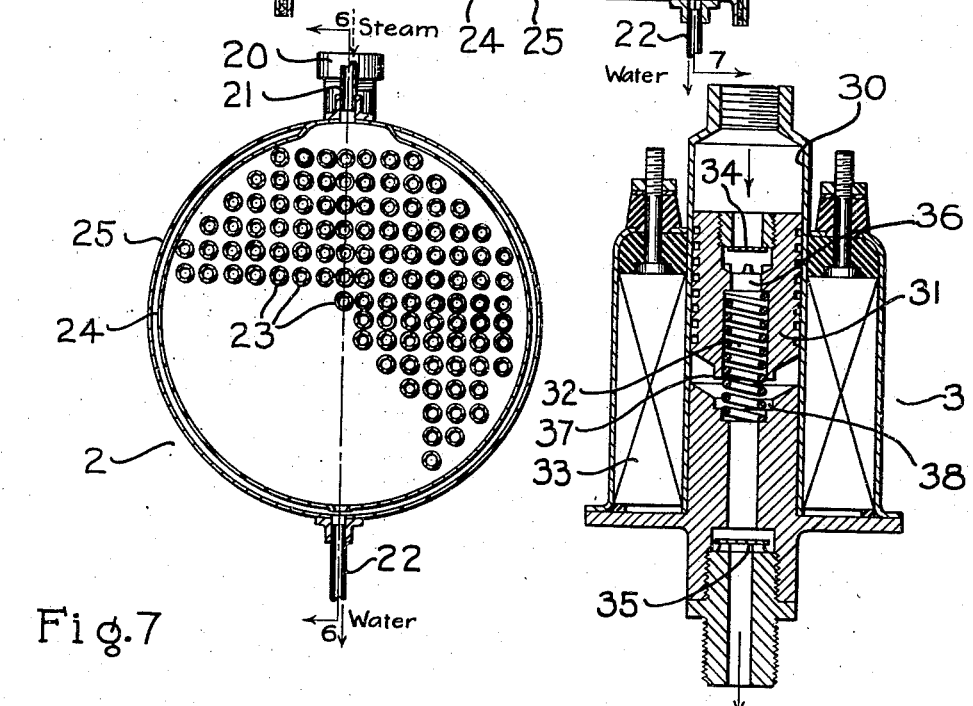
Fig. 7
Fig. 8
Inventor
Nathan C. Price
By Charles L. Reynolds
Attorney Patented Mar. 12, 1940

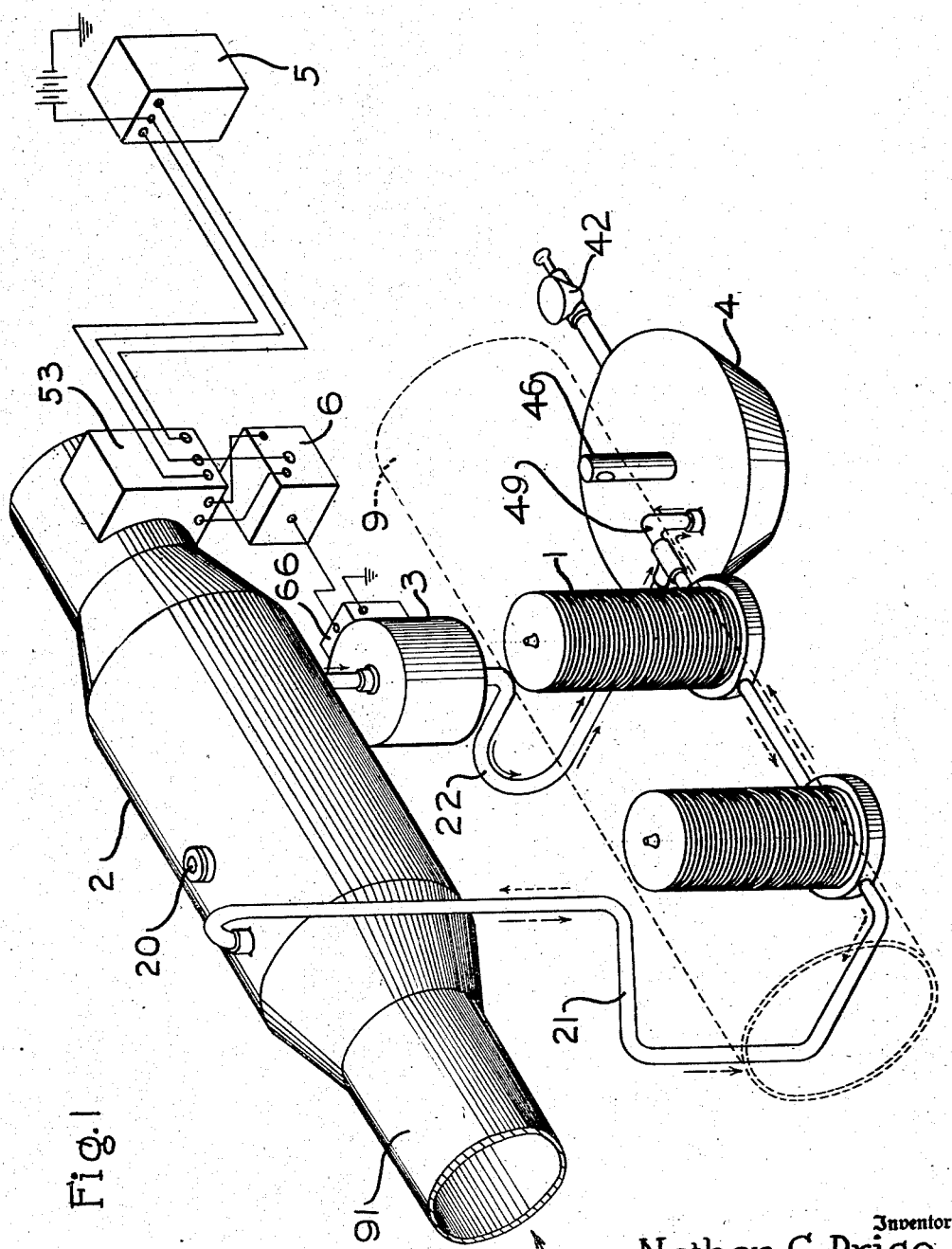

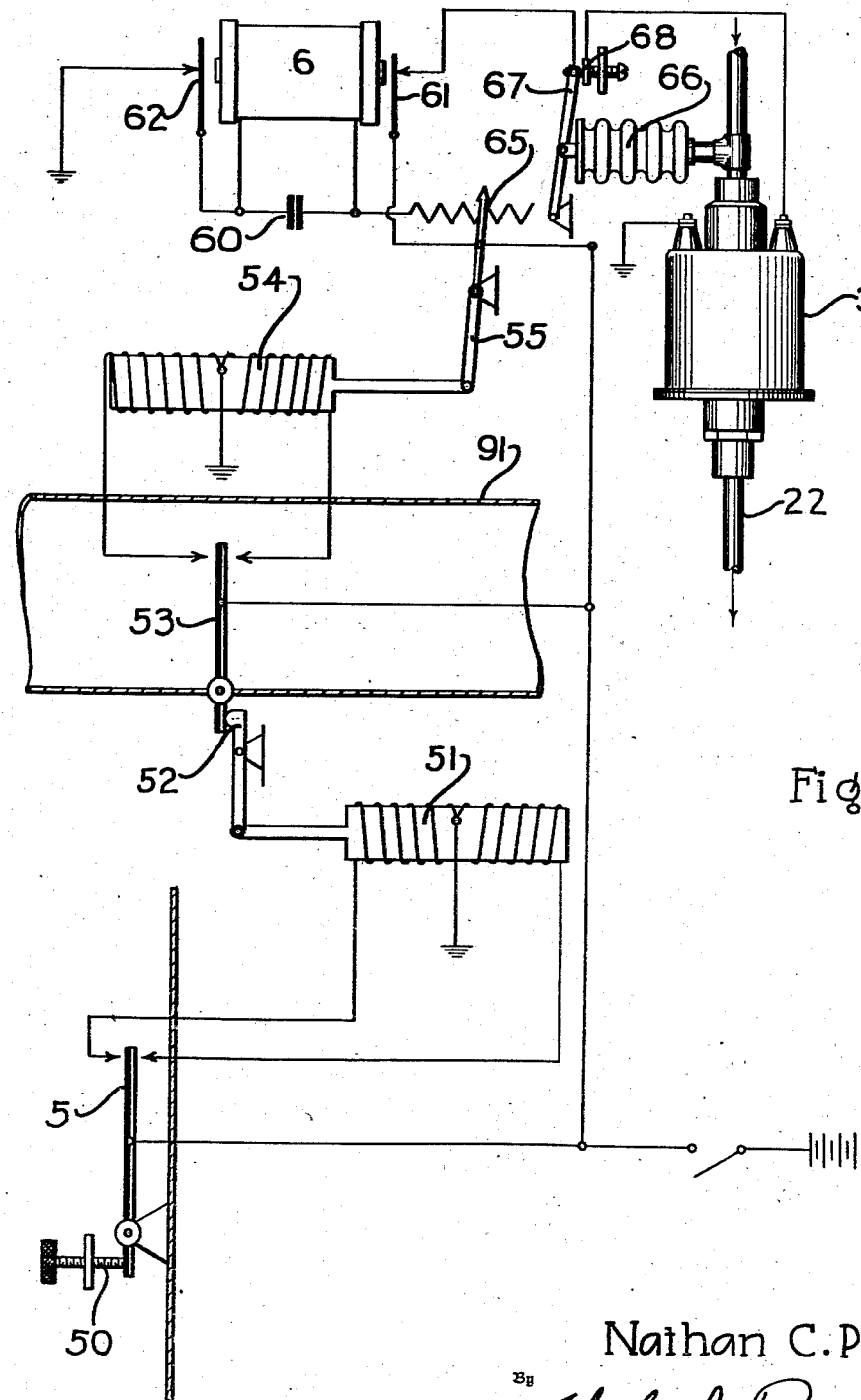

2,193,141

UNITED STATES PATENT OFFICE 2,193,141

HEATING SYSTEM FOR SUPERCHARGED CABINS

Nathan C. Price, Seattle, Wash., assignor, by mesne assignments, to The Pacific National Bank of Seattle, Seattle, Wash., a national banking association Application August 23, 1937, Serial No. 160,372

20 Claims. (Cl. 237—12.3)

This invention relates to the heating of the interior of an airplane; for instance, the interior of the passenger cabin. That particular use is illustrated, and while the system to be described has characteristics that peculiarly adapt it to this use, it is to be understood that the system may be applied to other uses.

Airplanes are subjected to extremes of temperature, and the change may be rapid, especially in airplanes designed to fly at high altitudes. The air plane may take off from a field where the temperature is warm or hot, and may, in a comparatively few minutes, rise to an elevation where the temperature is quite cold. In a long distance flight, it may be subjected to extremes of temperature varying between tropical temperatures and arctic temperatures. Between flights it may be subjected to freezing temperatures. The heating system employed must be such as will be sufficiently flexible to adapt itself readily and to be subject to automatic control, to compensate for these changes in temperature; and it is one of the objects of this invention to devise a system which will have the advantages indicated.

Such a system conveniently employs steam generated by the heat of the exhaust gases as a means of communicating heat to air taken into the cabin; but this introduces a further complication, in that such systems as heretofore designed require a considerable amount of servicing, and parts need frequent replacing, constituting an unduly high servicing cost. Water levels must be kept up so that there is always sufficient water in the system to operate it properly, and when the airplane is likely to be subjected to freezing temperature, the system must be drained to avoid the possibility of damage. Even in flight, with such system, there is the possibility that exposed parts of the system may freeze. With the addition of water from time to time from various sources, difficulties arise because of the deposition of scale, or the introduction of other foreign matter into the system. A further object of the invention is to devise a system which will be free from the possibility of such difficulties and interruptions, and in general to provide a system wherein it is unnecessary to supply additional water, even occasionally; where it is unnecessary to drain the system when there is the likelihood of freezing; which will operate without the necessity of frequent servicing or inspection; and which will give proper regulation of the temperature of the incoming air, and which will be subject to automatic control over a wide range of external temperatures.

It is also an object to provide the several elements of such a system in forms which are peculiarly adapted to incorporation in the system as a whole, as for instance the pump, the condenser, the water tank, and the boiler, and to improve these elements in detail.

With these and other objects in mind, as will appear hereafter, my invention comprises the novel system, as a whole, and the novel elements thereof, and their combination in such a system, all as shown in the accompanying drawings, and as will appear more fully in this specification, and in the claims which terminate the same.

In the accompanying drawings, my invention is shown in a typical system, and with the individual parts formed and arranged in a manner now preferred by me, although it will be evident that various changes may be made in the arrangement and in the details of the individual parts, all within the scope of this invention.

Figure 1 is a diagram, in perspective, showing the system as a whole, and the relative arrangement of the parts thereof.

Figure 2 is a diagram of the electrical control system.

Figure 3 is a sectional view of the boiler or steam generator, shown in association with the exhaust stack.

Figure 4 is an axial section through the water tank, and Figure 5 is a fragmentary section of a modified form of such tank.

Figure 6 is an axial section through the condenser, and Figure 7 is a transverse section of the same, substantially on the line 7—7 of Figure 6.

Figure 8 is an axial section through the pump.

The system as a whole, shown in Figure 1, includes a steam generator 1, inserted within the exhaust stack 9 of one of the engines of the airplane, and preferably two such generators are employed. A condenser 2 is inserted in the air intake conduit 91 through which air is conducted to the interior of the cabin which is to be warmed. It may lead from a scoop or from a supercharger, as is customary. The generator or generators are connnected to the condenser by a steam conduit 21, and a condensation return conduit 22 connects the condenser with the generator. This constitutes a closed circulation system, within which, and normally in the condensation return conduit 22, is incorporated a pump 3 which is of a character that provides no opening and no likelihood of failure in the closed system. A water tank 4 is connected to the system by the passage 49, and to expel water therefrom a flue, generally indicated by the numeral 46, is provided whereby exhaust gases may be led through the tank 4 to heat the contents thereof. The tank is sealed so that there can be no escape of steam or water from the system. The only means by which water can escape is through suitable drains or through a poppet valve 20.

Preferably the system is so arranged that the parts are close together and no one part has any appreciable elevation above any other part, to the end that there is but a slight hydrostatic differential developed in the system. As a result there is but little tendency for thermal circulation, as will be apparent as this description progresses. Reliance is therefore placed upon the pump 3 to maintain the circulation, and by controlling the rate of pumping, the rate of circulation can be controlled. The system is also so arranged that all parts will drain to the tank 4, and the tank is of such capacity as to hold all the water necessary for the proper operation of the system. Thus when the system is not in use, all water drains into the tank, and the tank, by reason of its peculiar construction, is rendered freeze-proof. The tank need have no appreciable capacity in excess of the amount of water for maintaining circulation in the system. The direction of flow of water in the system is indicated generally by the solid arrows, the direction of steam flow is indicated by the dash arrows, and the direction of drainage is indicated by the dot-dash arrows, particularly in Figure 1.

The boiler is in itself particularly designed for such a system. It is designed as a flash boiler to have high efficiency; to hold the water and vaporous particles against the heated surfaces by centrifugal action; to send them through the boiler at high velocity; to jacket the incoming water; to be self-cleaning or to be capable of cleaning readily by merely withdrawing an inserted core, and to have the highest degree of efficiency of pick-up of heat from the exhaust gases with minimum resistance to exhaust gas flow. This boiler forms the subject-matter of my application Serial No. 175,682, filed November 20, 1937.

As seen in Figure 3, the boiler, or generator, comprises an external shell 10 having external fins 11 placed parallel to the direction of flow of gases through the stack 9, and having a smooth bore 12. Within this smooth bore is received a hollow core 13 having helically disposed ribs 14 lying closely adjacent the walls of the bore 12 to constitute a helical or tortuous path for the water and vapor particles. The interior of the hollow core 13 is provided with an inserted tube 15, spaced somewhat from the walls of the interior of the core for the greater part of its length, and sufficiently sealed to prevent the admission of water or steam into the space between them, this space serving as a surrounding insulating space for relatively cool incoming water or vapor flowing in the tube 15.

Water enters from the conduit 22 through an appropriate port in the shell 10 and, as indicated at 16, passes to the interior of the tube 15 and up this tube to the upper end of the core 13, where it discharges into the bore 12 of the shell. During its passage through the tube 15 it is insulated by the space referred to above. Entering the bore 12 under pressure, it is forced through the helical passage defined by the rib 14, and is whirled about this passage at high speed and thereby is held by centrifugal force against the interior of the bore 12 to take up heat to the maximum degree from the heated walls of the shell, which walls have been heated by transmission of heat from the fins 11. After it is converted into steam at a considerable temperature, it is discharged through a port 17 to the steam conduit 21. A by-pass 18, controlled by a check valve, connects the passages 16 and 17, and the check valve is arranged to permit drainage direct through the by-pass 18, but to prevent direct passage of water from the passage 16 to the passage 17. Preferably the boiler is placed substantially upright so that all water contained within the shell or within the tube 15 will drain through appropriate passages, in the direction indicated by the arrows in Figure 3. The core 13 is threaded within the shell 10, and an inspection cap 19 may be removed to afford access to the core and to permit its removal. To remove it, it is slid outwardly, and in so doing the ribs 14 act as scrapers to remove any accumulation of foreign matter within the smooth bore 12, so that the boiler is to a considerable degree self-cleaning by the mere operation of removing the core. Furthermore, the high velocity and the centrifugal effect of the steam as it passes through the generator, serves to keep its interior clean. Since the airplane is subject to vibration, it is preferable to provide a tip 10' at the end of the shell 10 to be received in a suitable recess in the interior wall of the exhaust stack 9, to prevent vibration of the generator relative to the exhaust stack in which it is mounted.

The condenser may be of any suitable form, but preferably, as shown in Figures 6 and 7, it is a cartridge type condenser consisting of tubes 23 inset within an enlargement of the air intake conduit 91, through which tubes passes the air on its way to the cabin, and about which tubes passes the steam. Preferably the condenser is formed with an interior shell 24 and an outer jacket 25 spaced therefrom, but communicating with the interior of the shell 24 at the low point of the condenser, so that air, within the system, may be forced by steam pressure into this jacket space, as insulation, and steam may collect therein, for the same purpose, thus clearing the system of air when the system is in operation, but permitting the air to expand and to refill the system when the system is not in operation. The condenser as a whole is conveniently supported in a manner to prevent undue vibration by means of the rubber sleeves 26, at each end thereof, at its junction with the interrupted air intake conduit 91.

The water tank 4 is shown in detail in Figure 4, and in a modified form in Figure 5. Preferably, though not essentially, it is circular in plan, but is formed with upwardly flared walls 40, and these are preferably insulated as indicated at 41. It is flared to a point above the normal water level, and this level is controlled by a filling means such as the funnel 42, and a valve 43 by which it is sealed when filled to the level permitted. It is also provided with a drain valve 44 at its lowest point, and with a comparatively small discharge port 45 which in Figure 4 is shown as above the normal water level, or which, as shown at 45' in Figure 5, extends below the normal water level; in the one case, the fluid is discharged as steam, and in the other case as liquid water. The port 45' in the latter case is directed along the flue 46 (later referred to) so that water in the port 45' may thaw immediately during thawing, and steam cannot be trapped in the tank without means of escape.

The tank, as indicated above, is of a capacity sufficient to contain all the water necessary for the operation of the system but preferably no more. This quantity may be very small, since it is converted into steam, during operation of the system, and is expelled from the tank 4. In consequence, this small quantity does not expand greatly if it freezes, but the upwardly flared walls of the tank negative the possibility of damage from expansion, due to freezing, in that any such expansion which occurs is primarily upward, or such pressure as is lateral in direction, merely causes the frozen or nearly frozen mass to slide upwardly in the tank instead of producing bursting effects. Thus, the system may be left full of water to the required capacity at all times, and may be subjected to freezing temperatures, yet without the possibility of damage due to freezing. The tank is of material which is not harmfully affected when emptied of water, to supply the circulating system, and its form further renders it proof against damage under such circumstances.

In order that the system may be put into operation, means are provided for passing hot exhaust gases through the tank to heat the water and to expel it by generation of steam; thus in Figure 4 the flue is shown at 46, having an entrance at 47 arranged within the exhaust stack, as a scoop to intercept hot gases and to lead them through the flue 46 which is immersed within the water in the tank, and these gases may escape from a port 48 which leads them back to the interior of the exhaust stack 9. It will be observed that whenever the engines are operating, hot gases will pass through the flue 46. Any water in the tank will be converted into steam, and will be forced out of the tank, and into the remainder of the system. This vaporous steam will enter the generator 1, and will be converted into steam at considerable temperature and pressure, but the system is made sufficiently strong to resist the pressure, and no harm can result. It might be imagined, however, that this would produce undue heating of the intake air at times when this might not be desired. This may be momentarily true when the system first starts to function, but the rate of heat exchange between the condenser and the intaken air is dependent upon the continuous rate of flow of steam and water of condensation through the system, and this in turn is controlled by the pump 3. Furthermore the actual quantity of liquid to be expelled from the tank is very small, and the total amount of heat for its transfer to the condenser is therefore relatively small. If the pump is operating very slowly, or not at all, the rate of heat exchange is so slow as to be negligible, yet the system is full of steam. The rate of flow is negligible in part because of the very low hydrostatic differential between the high point in the system and its low point, so that there is little circulation due to hydrostatic pressure, and since the system is largely filled with steam and very little liquid water, there is little or no thermally-induced circulation.

By the arrangement shown in Figure 5 the amount of heat addition to drive the water from the tank to the condenser is further minimized since the water is driven from the tank in liquid form by steam trapped above the water in the tank.

The pump 3 is in itself peculiarly designed for and adapted to such a system. The structure of this pump forms the subject-matter of my application Serial No. 177,527, filed December 1, 1937. Its plunger is not affected by the system pressure, but only by external controls. The plunger 31 is freely floating within a chamber 30 which is in effect an enlargement or continuation of the condensation return conduit 22. This plunger 31 is of magnetic material. It is held in an upper position, or urged towards an upper position, by a spring 32. Surrounding the chamber 30 is the coil 33 of an electromagnet or solenoid, upon energization of which the plunger 31 is drawn downwardly in opposition to the spring 32. Upon the breaking or reversal of the current through the solenoid, the plunger 31 is permitted to move upwardly, and thus by controlling the impulse rate of the solenoid, the pumping rate is controlled. Valves 34 and 35 control the intake and discharge from the pump, respectively, the plunger 31 having an axial bore 36 through which the water passes. The valves 34 and 35 are so arranged as to permit drainage of the pump when it is not operating. To check downward movement of the plunger, it is provided at its lower end with a cylindrical extension 37 which enters a similarly shaped pocket 38, thereby trapping water outside of the extension 37, to serve as a cushion to check the downward movement of the plunger.

The system is susceptible of very close control, preferably by thermostatic means; thus a bimetal arm or any convenient thermostatic device, indicated at 5, is placed within the interior of the cabin and serves as the primary control. It may be manually adjustable as indicated at 50. This controls reversed circuits through a solenoid 51 to operate an adjusting arm 52 regulating the position of a second thermostat or bi-metal element 53 placed within the influence of the temperature of the air passing through the air intake duct 91, preferably after it has been warmed by passing the condenser 2. In turn this controls the reversed circuits of a solenoid 54 which operates a regulating arm 55 connected to a variable rheostat 65 or similar control device, connected in circuit with a relay 6.

The relay is in circuit with a condenser 60, whereby the rate of attraction and release of points 61 and 62 is controlled through the rheostat 65, and this, in turn, controls the rate of energization of the solenoid 33 which operates the pump 3. Thus the rate of pumping is directly controlled by and in accordance with, and as a function of, the temperature of the cabin interior, and indirectly as a function of the temperature in the air intake duct 91.

In addition, the pump may be controlled in accordance with the pressure in the circulating system, establishing a limit pressure. A Sylphon 66 or similar pressure-responsive element is connected in the circulating system, and by its expansion or contraction regulates a contact arm 67 cooperating with an adjustable contact 68. Thus as pressure in the circulating system increases beyond a desired maximum for which the contact 68 is adjusted, the circuit to the solenoid 33 will be broken and the pump will cease operating, and because no additional water is supplied to the steam generator the pressure in the system will drop and cannot exceed the maximum for which the controls are set.

It will be seen that the system thus is capable of close adjustment and automatic control; that it is freeze-proof; that it will automatically supply heat when desired, and that even if the water in the tank has frozen, as soon as the engine commences to operate, this ice will be thawed and steam will be generated to commence the operation of the system, so that it is quickly responsive once the engines have been started.

What I claim as my invention is:

1. Means to heat the interior of an aircraft cabin, comprising, in combination with a conduit for intake of air to the cabin, and with an engine exhaust stack a steam generator disposed in heat exchange relation to the exhaust stack to be heated by the exhaust gases passing through the stack, a condenser disposed in the air intake conduit to deliver heat to air passing therethrough, a closed circulation system including the generator and condenser, and including also a steam conduit connecting the generator with the condenser and a condensation return conduit connecting the condenser with the generator, pump means in the circulation system to effect circulation at a controlled rate through the system, and means controllable under the influence, jointly, of the temperature of the cabin and of the temperature of the incoming air, to vary the pumping rate to control the rate of circulation.

2. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing therethrough, thereby to convert water into steam, a condenser disposed in the air intake conduit to deliver heat to air passing therethrough, a closed circulation system including the generator and condenser and including also a steam conduit connecting the generator with the condenser and a condensation return conduit connecting the condenser with the generator, a pump plunger and appropriate valves enclosed within the condensation return conduit to effect circulation through the system, and means controllable under the influence, jointly, of the temperature of the cabin and of the temperature of the incoming air, to reciprocate said pump plunger at a controlled rate, to govern thereby the rate of circulation through the system.

3. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing through the stack, a condenser disposed in the air intake conduit to deliver heat to air passing therethrough, a closed circulation system including the generator and condenser, and including also a steam conduit connecting the generator with the condenser and a condensation return conduit connecting the condenser with the generator, a closed water supply tank connected into the system, at the lowest point thereof, the system and all parts thereof being formed and arranged to drain to the tank, and the latter being of capacity to contain all the water in the system, but small enough to contain no appreciable excess of water beyond that required for operation of the system, and means to heat the water in the tank, to expel it therefrom, and to prevent return of the major portion of the water to the tank during its circulation through the system.

4. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing therethrough, a condenser disposed in the air intake conduit to deliver heat to air passing therethrough, a closed circulation system including the generator and condenser, and including also a steam conduit connecting the generator with the condenser and a condensation return conduit connecting the condenser with the generator, a closed water supply tank connected into the system, at the lowest point thereof, the system and all parts thereof being formed and arranged to drain to the tank, and the latter being of capacity to contain all the water in the system, but small enough to contain no appreciable excess of water beyond that required for operation of the system, and means to heat the water in the tank, to expel it therefrom, and to prevent return of the major portion of the water to the tank during its circulation through the system, and means to effect positive circulation through the system at a controlled rate.

5. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing therethrough, a condenser disposed in the air intake conduit to deliver heat to air passing therethrough, a closed circulation system including the generator and condenser, and including also a steam conduit connecting the generator with the condenser and a condensation return conduit connecting the condenser with the generator, a closed water supply tank connected into the system, at the lowest point thereof, the system and all parts thereof being formed and arranged to drain to the tank, and the latter being of capacity to contain all the water in the system, but small enough to contain no appreciable excess of water beyond that required for operation of the system, a flue tapping the exhaust gas conduit to lead exhaust gases through said tank, to melt any ice therein and to expel the water from the tank, and to prevent return of the major portion of the water to the tank during its circulation through the system.

6. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing therethrough, a condenser disposed in the air intake conduit to deliver heat to air passing therethrough, a closed circulation system including a steam conduit connecting the generator with the condenser and a condensation return conduit connecting the condenser with the generator, a closed water supply tank connected to said circulation system, and located at the lowest point therein, and the several parts of such system, being disposed and arranged to drain to and to collect all water in the water supply tank.

7. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing therethrough, a condenser disposed in the air intake conduit to deliver heat to air passing therethrough, a closed circulation system including a steam conduit connecting the generator with the condenser and a condensation return conduit connecting the condenser with the generator, a closed water supply tank connected to said circulation system, and located at the lowest point therein, and the several parts of such system being disposed and arranged to drain to and to collect all water in the water supply tank, and means controlled by and in accordance with the temperature of the cabin interior, to control the rate of circulation through the system, as needed to maintain the cabin temperature.

8. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing therethrough, a condenser disposed in the air intake conduit to deliver heat to air passing therethrough, a closed circulation system including a steam conduit connecting the generator with the condenser and a condensation return conduit connecting the condenser with the generator, a closed water supply tank connected to said circulation system, and located at the lowest point therein, and the several parts of such system being disposed and arranged to drain to and to collect all water in the water supply tank and means to heat the water in said tank, thereby to expel it to the generator, preliminary to its circulation through the system.

9. Means to heat the interior of an aircraft cabin, comprising, in combination with a conduit for intake of air to the cabin, and with an engine exhaust stack, a flash boiler disposed in heat exchange relation to the exhaust stack to be heated by the exhaust gases passing therethrough, a condenser disposed in the air intake conduit to deliver heat to air passing therethrough, a closed circulation system including a steam conduit connecting the boiler and the condenser and a condensation return conduit connecting the condenser with the boiler, a pump included in the condensation return conduit, a closed water supply tank connected to said circulation system, and located at the lowest point therein, the several elements of such system being disposed and arranged to drain to and collect all water in the water supply tank, and means controlled by and in accordance with the temperature of the cabin interior, to regulate the pump, and thereby to control the rate of circulation, as needed to maintain the cabin temperature.

10. Means to heat the interior of an aircraft cabin, comprising, in combination with a conduit for intake of air to the cabin, a heat exchanger disposed in such conduit to heat the air passing to the cabin, a boiler operatively connected to heat said heat exchanger through generation of steam in the boiler, means to maintain the boiler at an elevated temperature, means to supply water to the boiler, means controlled by and in accordance with changes in the temperature of the intake air to control the rate of supply of water to the boiler, and means controlled by and in accordance with changes in the temperature of the cabin interior to alter the setting of the first-named control means, thereby to regulate the rate of supply of water to the boiler as a combined function of the cabin temperature and of the intake temperature.

11. Means to heat the interior of an aircraft cabin, comprising, in combination with a conduit for intake of air to the cabin, a heat exchanger disposed in such conduit to heat the air passing to the cabin, a boiler operatively connected to heat said heat exchanger through generation of steam in the boiler, means to maintain the boiler at an elevated temperature, means to supply water to the boiler, a pump to supply water to the boiler, electrical means to drive said pump, a circuit including said latter means and timing means governing the pumping rate, a thermostat governed by changes in intake temperature, and operatively connected to regulate said timing means, and a second thermostat governed by changes in cabin temperature, and operatively connected to regulate the operative positions of the first thermostat, thereby to control the water supply to the boiler as a combined function of changes in intake temperature and in cabin temperature.

12. Means to control the temperature in the interior of an aircraft cabin, comprising, in combination, a water circulation system, steam generating means in said system, condenser means in said system arranged and disposed to affect the cabin temperature, and pump means in said system to circulate the water in a given direction, and means controlled jointly by and in accordance with the temperature of the cabin interior, and the temperature of the incoming air to vary the rate of reciprocation of the pump means, and hence the rate of water circulation, between zero and a maximum, as and when required to maintain the cabin temperature substantially at a selected value.

13. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing through the stack, a condenser disposed in the air intake conduit to deliver heat to air passing therethrough, a closed circulation system including a steam conduit connecting the generator with the condenser, and a condensate return conduit connecting the condenser with the generator, a closed water supply tank connected to said circulation system, means acting under the influence of the temperature of the exhaust gases to expel water from the tank into the circulation system, pump means in the circulation system to effect circulation through the system at a controlled rate, regardless of the amount of water or vapor in such system, and means controllable under the influence, jointly, of the temperature of the cabin and of the incoming air, to vary the pumping rate to control the rate of circulation.

14. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing through the stack, a condenser disposed in the air intake conduit to deliver heat to air passing therethrough, a closed circulation system including a steam conduit connecting the generator with the condenser, and a condensate return conduit connecting the condenser with the generator, a closed water supply tank connected to said circulation system, means acting under the influence of the temperature of the exhaust gases to expel water from the tank into the circulation system, pump means in the circulation system to effect circulation through the system at a controlled rate, regardless of the amount of water or vapor in such system, and means controllable under the influence of air which has been heated by the condenser to vary the pumping rate, to control the rate of circulation.

15. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing through the stack, a condenser disposed in the air intake conduit to deliver heat to air passing therethrough, a closed circulation system including a steam conduit connecting the generator with the condenser, and a condensate return conduit connecting the condenser with the generator, a closed water supply tank connected to said circulation system, means acting under the influence of the temperature of the exhaust gases to expel water from the tank into the circulation system, pump means in the circulation system to effect circulation through the system at a controlled rate, regardless of the amount of water or vapor in such system, and means responsive to variations in cabin air temperature to vary the pumping rate, to control the rate of circulation.

16. Means to heat the interior of an aircraft cabin, comprising, in combination with a conduit for intake of air to the cabin, and with an engine exhaust stack, a steam generator disposed in heat exchange relation to the exhaust stack to be heated by the exhaust gases passing through the stack, a condenser disposed in the air intake conduit to deliver heat to air passing therethrough, a closed circulation system including a steam conduit connecting the generator with the condenser, and a condensate return conduit connecting the condenser with the generator, a closed water supply tank connected to said circulation system, means acting under the influence of the temperature of the exhaust gases to expel water from the tank into the circulation system, pump means in the circulation system to effect circulation through the system at a controlled rate, regardless of the amount of water or vapor in such system, and temperature-responsive means independent of the temperature of the exhaust gases to vary the pumping rate, to control the rate of circulation.

17. Heating means comprising, in combination, a heat exchanger disposed to be heated by a hot primary fluid, a condenser disposed to heat a secondary fluid, a closed circulation system containing a tertiary fluid, and connecting the heat exchanger and the condenser, whereby the tertiary fluid is heated by the primary fluid, a closed tertiary fluid supply tank connected to said circulation system, means acting under the influence of the hot primary fluid to expel tertiary fluid from the tank into the remainder of the circulation system, pump means in the circulation system to effect circulation through the system at a controlled rate, regardless of the amount of tertiary fluid in such system, and means responsive to variations in temperature of the secondary fluid, and independent of variations in temperature of the primary fluid, to variably control the pumping rate to control the rate of circulation.

18. Heating means comprising, in combination, a heat exchanger disposed to be heated by a hot primary fluid, a condenser disposed to heat a secondary fluid, a closed circulation system containing a tertiary fluid, and connecting the heat exchanger and the condenser, whereby the tertiary fluid is heated by the primary fluid, a closed tertiary fluid supply tank connected to said circulation system, means acting under the influence of the hot primary fluid to expel tertiary fluid from the tank into the remainder of the circulation system, pump means in the circulation system to effect circulation through the system at a controlled rate, regardless of the amount of tertiary fluid in such system, and means responsive to variations in temperature of the secondary fluid, to vary correspondingly the rate of heat exchange to the secondary fluid, independently of the temperature of the primary fluid.

19. Heating means comprising, in combination, a heat exchanger disposed to be heated by a hot primary fluid, a condenser disposed to heat a secondary fluid, a closed circulation system containing a tertiary fluid, and connecting the heat exchanger and the condenser, whereby the tertiary fluid is heated by the primary fluid, a closed tertiary fluid supply tank connected to said circulation system, means acting under the influence of the hot primary fluid to expel tertiary fluid from the tank into the remainder of the circulation system, pump means in the circulation system to effect circulation through the system at a controlled rate, regardless of the amount of tertiary fluid in such system, and means responsive to variations in temperature of the secondary fluid, to vary correspondingly the rate of heat exchange between the primary and tertiary fluids, independently of the absolute temperature of either the primary or the tertiary fluid.

20. Means to control the temperature in the interior of an aircraft cabin, comprising, in combination, a water circulation system, means in said system to generate steam therein, condenser means in said system arranged and disposed to heat the cabin air, a pump in said system to circulate the water in a given direction, and, as the sole control of the rate of heating, means controlled by and in accordance with the temperature of the cabin interior, to variably maintain the rate of water circulation automatically at any value between zero and a maximum, as and when required to maintain the cabin temperature substantially at a selected value.

NATHAN C. PRICE.